C. AHLSWEDE.
VEHICLE SIGNALING DEVICE.
APPLICATION FILED AUG. 7, 1919.
1,337,185.  Patented Apr. 20, 1920.
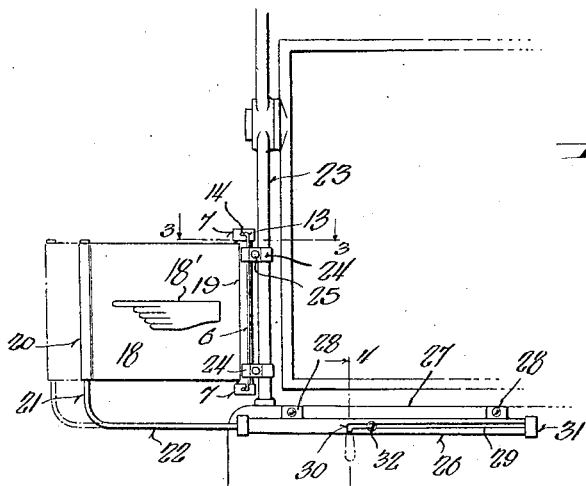
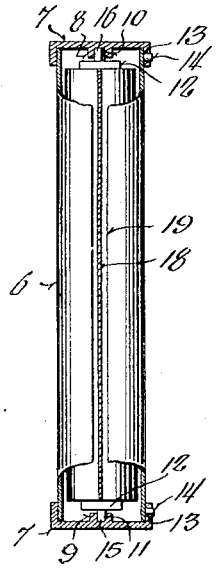
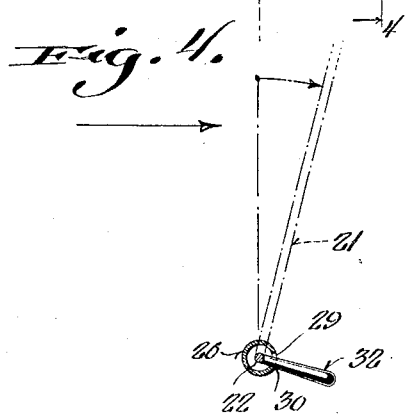
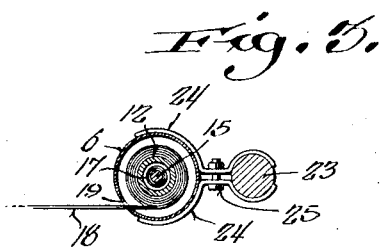
Witness:
Ira M. Jones
Inventor:
Charles Ahlswede
By Morsell + Keeney
Attorneys.

UNITED STATES PATENT OFFICE.

CHARLES AHLSWEDE, OF MANITOWOC, WISCONSIN.

VEHICLE-SIGNALING DEVICE.

1,337,185.  Specification of Letters Patent. Patented Apr. 20, 1920.

Application filed August 7, 1919. Serial No. 315,969.

*To all whom it may concern:*

Be it known that I, CHARLES AHLSWEDE, a citizen of the United States, and resident of Manitowoc, in the county of Manitowoc and State of Wisconsin, have invented new and useful Improvements in Vehicle-Signaling Devices, of which the following is a description, reference being had to the accompanying drawings, which are a part of this specification.

My invention relates to certain new and useful improvements in vehicle signaling devices more particularly adapted for automobile use.

It is one of the objects of the present invention to provide a vehicle signaling device which will indicate to the driver of a vehicle following whether the vehicle ahead is going to make a stop, or whether it is going to turn in another direction of traffic.

Another object of the invention is to provide a vehicle signaling device which is readily visible and which is easily controlled by the operator.

A further object of the invention is to provide a vehicle signaling device which will be automatically releasably secured in indicating position when the indicator has been moved to its fully extended position.

A still further object of the invention is to provide a vehicle signaling device which is of simple construction, is strong and durable, and is well adapted for the purpose described.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is an elevational view of the rear of a signaling device embodying my invention, the same being depicted as attached to a portion of an automobile wind shield standard and dashboard.

Fig. 2 is a view partly in section and partly in elevation of the tubular casing containing the indicating curtain.

Fig. 3 is a sectional view through the tubular casing and the adjacent portion of the wind shield standard, said view being taken on the line 3—3 of Fig. 1, and Fig. 4 is a sectional view taken through the operating rod and guide therefor, the said view being taken on the line 4—4 of Fig. 1.

As illustrated in the drawings, the improved signal device includes an open-ended tubular casing or container 6, having its ends closed by removable caps or covers 7 provided with centrally disposed enlargements 8 and 9 formed on their inner faces and provided with recesses 10 and 11, having mounted therein the ends of a curtain roll 12. The caps or covers 7 are provided with key ways 13 to receive the locking studs 14, carried by the casing 6 adjacent its end, as best shown in Figs. 1 and 2.

The curtain roll 12 is of usual spring controlled construction having its end 15 squared for engagement with the correspondingly squared opening 11 in the enlargement 9 and its end 16 rounded and having a bearing in the recess 10 of the enlargement 8, a spring 17 (see Fig. 3) is confined within the roll 12 and connected with a portion of the end 15 disposed therein to normally wind an indicating curtain 18, which is carried by the roll 12. The curtain 18 has its outer end free and passed through a slot 19 extending along the casing 6 throughout its length, and is engaged, as at 20, with the upstanding end 21 of an operating rod 22.

As best shown in Figs. 1 and 3 the casing 6 is preferably removably secured to the adjacent side standard 23 of the vehicle wind shield by means of a pair of complementary binding clamps 24, having a portion shaped to fit the container 6 and a portion shaped to fit the standard 23 and held in engagement therewith by means of a binding bolt 25. By this form of securing means, the casing 6 may be readily secured to any portion of the vehicle desired.

The operating rod 22 is slidably mounted in a guide tube 26 which is secured to the dashboard 27, or any other part of the vehicle, by fastening means engaging the ears 28 carried by said guide tube. The guide tube 26 has formed therein a greater portion of its length a longitudinally extending guideway slot 29 which has its inner end terminating at a point spaced from the outer end of the tubing and provided with an offset notch or recess 30, for the purposes later described. The other end of the guideway is closed by means of a cap 31 closing the inner end of the guide tube 26.

Connected with the operating rod 22 near its end disposed within the guide tube 26 is an operating handle 32 which is passed outwardly of the guide tube through the guideway 29. As the handle 32 is moved along the guideway 29, the curtain 18 is correspondingly moved to its extended position or its position wound about the roll 12, and when the curtain 18 is moved to its full extended position, the same is locked in such position by the handle 32 dropping down into the offset notch 30.

The offset notch 30 provides an automatic locking means for the curtain 18 when it is moved to its full extended limit of movement, as the wind which is normally blowing thereagainst due to the forward movement of the vehicle, will tend to blow the curtain rearwardly (see Fig. 4) and consequently rotate the operating rod 22, and drop the handle 32 into the notch 30. To move the curtain 18 to its closed or inoperative position, the handle 32 is disengaged from the notch 30 and moved to the right with reference to Fig. 1, the spring 17 winding the curtain 18 upon the roll 12, as will be readily apparent to those skilled in the art to which an invention of this character appertains.

The curtain 18 has preferably painted or otherwise formed thereon an indicating hand 18' or any other designation which may be desired. The signaling device may be secured to the vehicle in any desired position where it will function most efficiently, and while I have shown but one device, it will be appreciated that another one may be employed upon the opposed side of the vehicle, so that in making a turn to the right, the right hand signal may be operated, or vice versa.

From the foregoing description taken in connection with the accompanying drawing, it will be readily apparent that I provide a vehicle signaling device which will be efficient in operation in that it has but a few operating parts, and consequently its getting out of order is rendered practically impossible and which will be attractive in appearance and will not in any manner detract from the general appearance of the vehicle upon which it is used.

What I claim as my invention is:

1. A device of the class described comprising an extendible indicator, means for extending the indicator, and releasable means operable automatically when the indicator reaches its extended position to secure the same in extended position.

2. A signal device of the class described comprising an indicator, means for moving the indicator to and from indicating position, and means operable by wind pressure against the indicator when in indicating position to releasably secure the same in its indicating position.

3. A vehicle signal comprising a casing, an extendible indicating curtain normally inclosed by the casing, a guide tube having a guide slot therein provided with an offset recess at its outer end, an operating rod slidably mounted in the guide tube and connected with the indicating curtain, and a controlling handle passed through the guide slot in the tube and connected to the operating rod to move the same to move the indicating curtain to and from its extended position, said curtain when in its extended position turning the operating rod a slight distance by reason of the wind pressure thereagainst to engage the handle in the offset recess and releasably secure the curtain in its extended position.

4. A vehicle signal comprising a tubular casing, means securing said casing to a support, a spring roller mounted in said casing, an indicating curtain having one end secured to said roller and its other end passed through an elongated opening in the casing, said curtain being normally rolled around said spring roller, a guide tube, means securing said guide tube to a support at substantially right angles to said tubular casing, an operating rod slidably mounted in said guide tube and having one end connected with the end of the indicating curtain passed through the elongated opening of the casing, a control handle carried by the operating rod and passed through a guide slot in the guide tube, and means operable when said control rod reaches its outer limit of movement to releasably secure the curtain in extended position.

5. A vehicle signal comprising a tubular casing, means securing said casing to a support, a spring roller mounted in said casing, an indicating curtain having one end secured to said roller and its other end passed through an elongated opening in the casing, said curtain being normally rolled around said spring roller, a guide tube, means securing said guide tube to a support at substantially right angles to said tubular casing, an operating rod slidably mounted in said guide tube and having one end connected with the end of the indicating curtain passed through the elongated opening of the casing, a guideway formed longitudinally in said guide tube and having an offset recess communicating therewith at its outer end, and a controlling handle passed through said guideway and secured to the operating rod to slide the same and move the indicating curtain to and from its extended indicating position, said curtain when in its extended position turning the operating rod a slight distance by reason of the wind pressure thereagainst to engage the handle in the offset recess and releasably secure the curtain in its extended indicating position.

In testimony whereof I affix my signature.

CHARLES AHLSWEDE.